US007653635B1

(12) United States Patent
Paek et al.

(10) Patent No.: US 7,653,635 B1
(45) Date of Patent: Jan. 26, 2010

(54) SYSTEMS AND METHODS FOR INTEROPERABLE MULTIMEDIA CONTENT DESCRIPTIONS

(75) Inventors: Seungup Paek, New York, NY (US);
Ana Benitez, New York, NY (US);
Shih-Fu Chang, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 09/830,899

(22) PCT Filed: Nov. 5, 1999

(86) PCT No.: PCT/US99/26125

§ 371 (c)(1),
(2), (4) Date: Aug. 13, 2001

(87) PCT Pub. No.: WO00/28440

PCT Pub. Date: May 18, 2000

(51) Int. Cl.
*G06F 17/30* (2006.01)
(52) U.S. Cl. ..................................... 707/100
(58) Field of Classification Search ................. 707/100, 707/102, 1, 2, 10, 104.1; 345/302; 725/136; 348/461; 382/199
See application file for complete search history.

(56) References Cited

U.S. PATENT DOCUMENTS

| | | | |
|---|---|---|---|
| 4,712,248 A * | 12/1987 | Hongo | 382/199 |
| 5,613,032 A | 3/1997 | Cruz et al. | 386/69 |
| 5,623,690 A | 4/1997 | Palmer et al. | 715/500.1 |
| 5,630,121 A * | 5/1997 | Braden-Harder et al. | 707/102 |
| 5,642,477 A | 6/1997 | de Carmo et al. | 715/500.1 |
| 5,696,964 A | 12/1997 | Cox et al. | 707/5 |
| 5,701,510 A | 12/1997 | Johnson et al. | 715/500.1 |
| 5,713,021 A | 1/1998 | Kondo et al. | 707/103 R |
| 5,758,076 A | 5/1998 | Wu et al. | 709/231 |
| 5,805,804 A | 9/1998 | Laursen et al. | 709/223 |
| 5,822,524 A | 10/1998 | Chen et al. | 709/203 |
| 5,893,095 A | 4/1999 | Jain et al. | |
| 6,079,566 A * | 6/2000 | Eleftheriadis et al. | 707/101 |
| 6,628,824 B1 | 9/2003 | Belanger | |

(Continued)

FOREIGN PATENT DOCUMENTS

WO 0028440 5/2000

OTHER PUBLICATIONS

V. Oria et al.,; "Modeling Images for Content-Based Queried: The DISIMA Approach", Second International Conference on Visual Information Systems, pp. 339-346, Dec. 1997.

(Continued)

*Primary Examiner*—Etienne P LeRoux
(74) *Attorney, Agent, or Firm*—Baker Botts LLP

(57) ABSTRACT

Systems and methods for generating standard description records from multimedia information are provided. The system includes at least one multimedia information input interface (180) receiving multimedia information, a computer processor, and a data storage system (150), operatively coupled to said processor, for storing said at least one description record. The processor performs object extraction processing to generate multimedia object descriptions (200, 201, 205) from the multimedia information, and object hierarchy processing (410, 420) to generate multimedia object hierarchy descriptions, to generate at least one description record including the multimedia object descriptions (200, 201, 205) and multimedia object hierarchy descriptions for content embedded within the multimedia information.

32 Claims, 6 Drawing Sheets

U.S. PATENT DOCUMENTS

| | | | |
|---|---|---|---|
| 6,886,013 B1 * | 4/2005 | Beranek | 707/10 |
| 2001/0000962 A1 * | 5/2001 | Rajan | 345/302 |
| 2005/0076055 A1 * | 4/2005 | Mory et al. | 707/104.1 |
| 2007/0237426 A1 | 10/2007 | Xie et al. | |

OTHER PUBLICATIONS

J.Z. Li et al., "Modeling of Moving Objects in a Video Database", Proceedings of IEEE International Conference on Multimedia Computing and Systems, pp. 336-343, Jun. 1997.

J.Z. Li et al., :Modeling Video Temporal Relationships in an Object Database Management System, IS&T/SPIE International Symposium on Electronic Imaging: Multimedia Computing and Networking, pp. 80-91, Feb. 1997.

C.H.C. Leung et al., "Picture Retrieval by Content Description", Journal of Information Science, No. 18, pp. 111-119, 1992.

E. Oomoto et al., "OVID: Design and Implementation of a Video-Object Database System", IEEE Transactions on Knowledge and Data Engineering, vol. 5, No. 4, pp. 629-643, Aug. 1993.

Chung-Sheng et al., 1998, "Multimedia content description in the Info Pyramid," *Acoustics, Speech and Signal Processing*; Proceedings of the 1998 IEEE International Conference, Seattle, WA, USA May 12-15, 1998, New York, NY, USA, IEEE: p. 3789-3792.

Oomoto et al., 1993, "OVID: design and implementation of video-object database system," *IEEE Transactions on Knowledge and Data Engineering*, vol. 5, No. 4: p. 629-643.

Bayram et al.: "Image Manipulation Detection,", Journal of Electronic Imaging 15(4), 041102, (Oct.-Dec. 2006).

Fridich et al.: "Detection of Copy-Move Forgery in Digital Images", *Proc. of DFRWS 2003*, Cleveland, OH, USA, Aug. 5-8 2003.

Japanese Patent Publication 04-49471 (English abstract provided) Feb. 18, 1992.

* cited by examiner

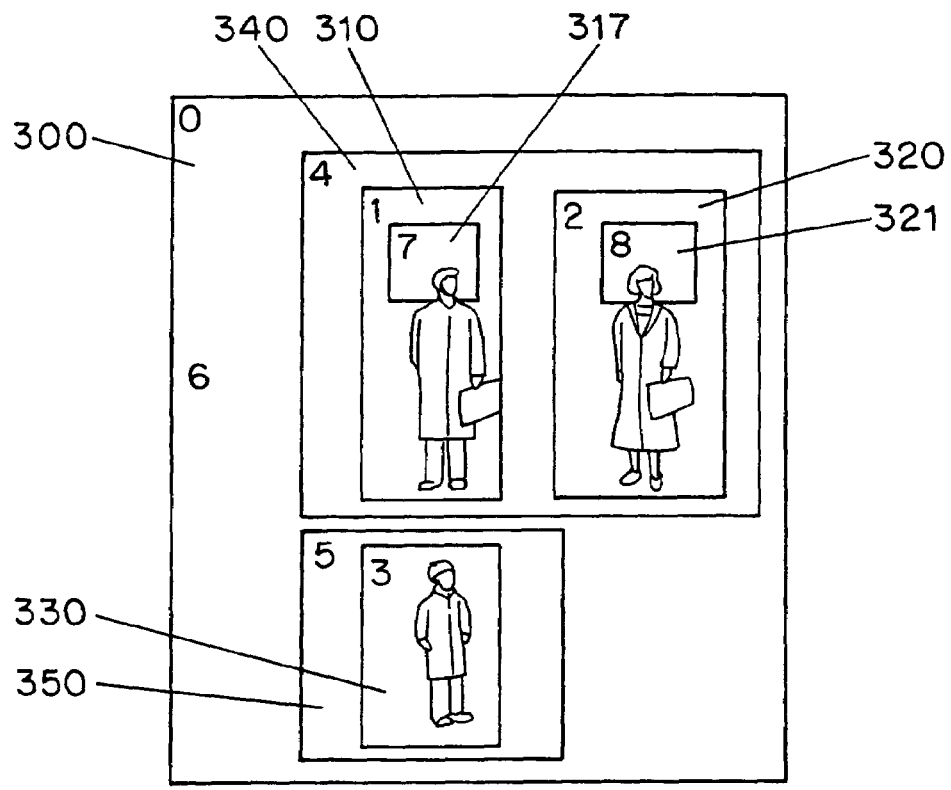
FIG. 3
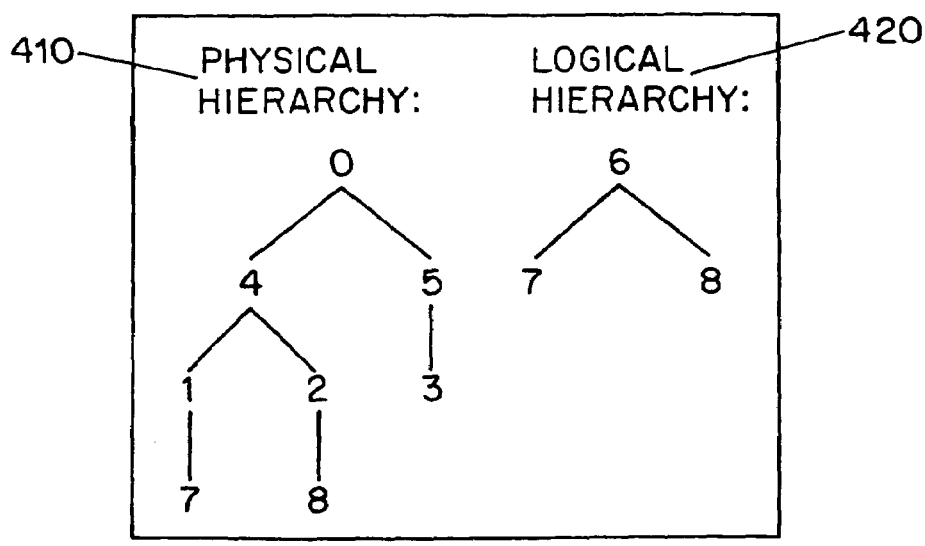
FIG. 4a
FIG. 4b

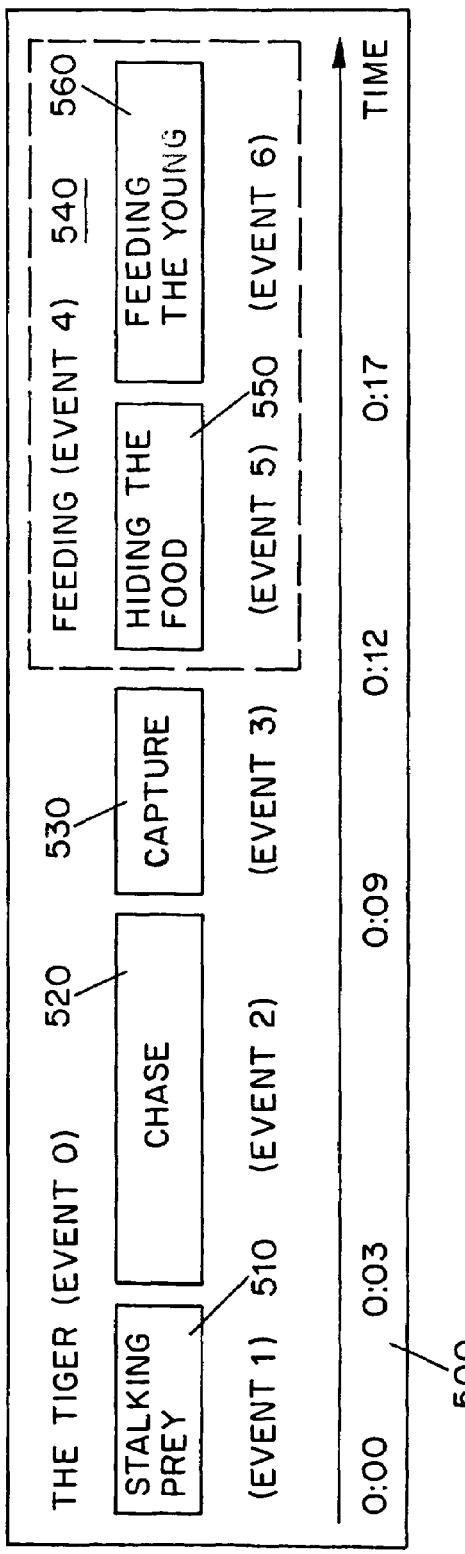
FIG. 5
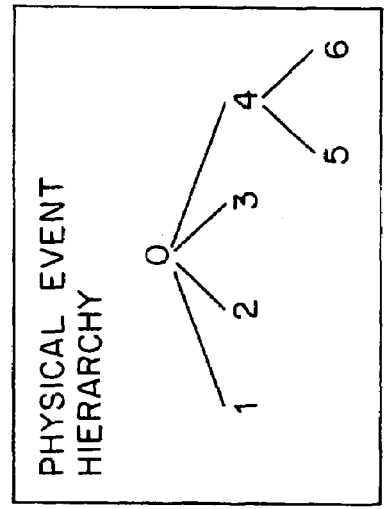
FIG. 6b
FIG. 6a

SYSTEMS AND METHODS FOR INTEROPERABLE MULTIMEDIA CONTENT DESCRIPTIONS

BACKGROUND OF THE INVENTION

I. Field of the Invention

The present invention relates to techniques for describing multimedia information, and more specifically, to techniques which describe both video and image information as well as to content of such information.

II. Description of the Related Art

With the maturation of the global Internet and the widespread employment of regional networks and local networks, digital multimedia information has become increasingly accessible to consumers and businesses. Accordingly, it has become progressively more important to develop systems that process, filter, search and organize digital multimedia information, so that useful information can be culled from this growing mass of raw information.

At the time of filing the instant application, solutions exist that allow consumers and business to search for textual information. Indeed, numerous text-based search engines, such as those provided by yahoo.com, goto.com, excite.com and others are available on the World Wide Web, and are among the most visited Web sites, indicating the significant of the demand for such information retrieval technology.

Unfortunately, the same is not true for multimedia content, as no generally recognized description of this material exists. In this regard, there have been past attempts to provide multimedia databases which permit users to search for pictures using characteristics such as color, texture and shape information of video objects embedded in the picture. However, at the closing of the 20th Century, it is not yet possible to perform a general search the Internet or most regional or local networks for multimedia content, as no broadly recognized description of this material exists. Moreover, the need to search for multimedia content is not limited to databases, but extends to other applications, such as digital broadcast television and multimedia telephony.

One industry wide attempt to develop such standard a multimedia description framework has been through the Motion Pictures Expert Group's ("MPEG") MPEG-7 standardization effort. Launched in October 1996, MPEG-7 aims to standardize content descriptions of multimedia data in order to facilitate content-focused applications like multimedia searching, filtering, browsing and summarization. A more complete description of the objectives of the MPEG-7 standard are contained in the International Organisation for Standardisation document ISO/IEC JTC1/SC29/WG11 N2460 (October 1998), the content of which is incorporated by reference herein.

The MPEG-7 standard has the objective of specifying a standard set of descriptors as well as structures (referred to as "description schemes") for the descriptors and their relationships to describe various types of multimedia information. MPEG-7 also proposes to standardize ways to define other descriptors as well as "description schemes" for the descriptors and their relationships. This description, i.e. the combination of descriptors and description schemes, shall be associated with the content itself, to allow fast and efficient searching and filtering for material of a user's interest. MPEG-7 also proposes to standardize a language to specify description schemes, i.e. a Description Definition Language ("DDL"), and the schemes for binary encoding the descriptions of multimedia content.

At the time of filing the instant application, MPEG is soliciting proposals for techniques which will optimally implement the necessary description schemes for future integration into the MPEG-7 standard. In order to provide such optimized description schemes, three different multimedia-application arrangements can be considered. These are the distributed processing scenario, the content-exchange scenario, and the format which permits the personalized viewing of multimedia content.

Regarding distributed processing, a description scheme must provide the ability to interchange descriptions of multimedia material independently of any platform, any vendor, and any application, which will enable the distributed processing of multimedia content. The standardization of interoperable content descriptions will mean that data from a variety of sources can be plugged into a variety of distributed applications, such as multimedia processors, editors, retrieval systems, filtering agents, etc. Some of these applications may be provided by third parties, generating a sub-industry of providers of multimedia tools that can work with the standardized descriptions of the multimedia data.

A user should be permitted to access various content providers' web sites to download content and associated indexing data, obtained by some low-level or high-level processing, and proceed to access several tool providers' web sites to download tools (e.g. Java applets) to manipulate the heterogeneous data descriptions in particular ways, according to the user's personal interests. An example of such a multimedia tool will be a video editor. A MPEG-7 compliant video editor will be able to manipulate and process video content from a variety of sources if the description associated with each video is MPEG-7 compliant. Each video may come with varying degrees of description detail, such as camera motion, scene cuts, annotations, and object segmentations.

A second scenario that will greatly benefit from an interoperable content description standard is the exchange of multimedia content among heterogeneous multimedia databases. MPEG-7 aims to provide the means to express, exchange, translate, and reuse existing descriptions of multimedia material.

Currently, TV broadcasters, Radio broadcasters, and other content providers manage and store an enormous amount of multimedia material. This material is currently described manually using textual information and proprietary databases. Without an interoperable content description, content users need to invest manpower to translate manually the descriptions used by each broadcaster into their own proprietary scheme. Interchange of multimedia content descriptions would be possible if all the content providers embraced the same scheme and content description schemes. This is one of the objectives of MPEG-7.

Finally, multimedia players and viewers that employ the description schemes must provide the users with innovative capabilities such as multiple views of the data configured by the user. The user should be able to change the display's configuration without requiring the data to be downloaded again in a different format from the content broadcaster.

The foregoing examples only hint at the possible uses for richly structured data delivered in a standardized way based on MPEG-7. Unfortunately, no prior art techniques available at present are able to generically satisfy the distributed processing, content-exchange, or personalized viewing scenarios. Specifically, the prior art fails to provide a technique for capturing content embedded in multimedia information based on either generic characteristics or semantic relationships, or to provide a technique for organizing such content.

Accordingly, there exists a need in the art for efficient content description schemes for generic multimedia information.

SUMMARY OF THE INVENTION

An object of the present invention is to provide content description schemes for generic multimedia information.

Another object of the present invention is to provide techniques for implementing standardized multimedia content description schemes.

A further object of the present invention is to provide an apparatus which permits users to perform general searches on the Internet or regional or local networks for multimedia content.

Still another object of the present invention is to provide a technique for capturing content embedded in multimedia information based on either generic characteristics or semantic relationships.

Still a further object of the present invention is to provide a technique for organizing content embedded in multimedia information based on either generic characteristics or semantic relationships.

In order to meet these and other objects which will become apparent with reference to further disclosure set forth below, the present invention provides a system for generating a description record from multimedia information. The system includes at least one multimedia information input interface receiving multimedia information, a computer processor, and a data storage system, operatively coupled to said processor, for storing said at least one description record. In order to satisfy the objectives of the present invention, the processor performs object extraction processing to generate multimedia object descriptions from the multimedia information, and object hierarchy processing to generate multimedia object hierarchy descriptions, to generate at least one description record including the multimedia object descriptions and multimedia object hierarchy descriptions for content embedded within the multimedia information In a preferred arrangement, the multimedia information is image information, the multimedia object descriptions are image object descriptions, and the multimedia hierarchy object descriptions are image object hierarchy descriptions. In an alternative preferred arrangement, the multimedia information is video information, the multimedia object descriptions are video object descriptions, and the multimedia object hierarchy descriptions are video object hierarchy descriptions.

Where the multimedia information is image information, it is highly preferred that the object extraction processing includes image segmentation processing to segment each image in the image information into regions, and feature extraction processing to generate one or more feature descriptions for one or more of the regions. The descriptions may include text annotations, color, texture, shape, size, and position information.

Likewise, it is advantageous for the object hierarchy processing to include physical object hierarchy organization to generate physical object hierarchy descriptions of the image object descriptions that are based on spatial characteristics of the objects, and logical object hierarchy organization to generate logical object hierarchy descriptions of the image object descriptions that are based on semantic characteristics of the objects, such that the image object hierarchy descriptions comprise both physical and logical descriptions. An encoder may be added to the system for encoding the image object descriptions and image object hierarchy descriptions into compressed description information.

Where the multimedia information is video information, it is highly preferred that the object extraction processing includes video segmentation processing to temporally segment the video information into one or more video events or groups of events, video object extraction processing to segment the video events into regions and generate feature descriptions for the regions; and feature extraction processing to generate one or more feature descriptions for the video events. The feature descriptions for events may include text annotations, shot transition, camera motion, time, and key frame. The feature descriptions for objects may include text annotations, color, texture, shape, size, position, motion, and time.

Likewise, it is advantageous for the object hierarchy processing to include both physical event and object hierarchy organization to generate physical event and object hierarchy descriptions of the video event and object descriptions that are based on temporal characteristics of the video events and objects, and logical event and object hierarchy organization to generate logical event and object hierarchy descriptions of the video event and object descriptions that are based on semantic characteristics of said the objects, and video object hierarchy extraction processing to generate hierarchy descriptions for events and objects embedded within the video information.

The present invention also provides methods to provide a content description scheme for generic multimedia information. In one arrangement, the method includes the steps of receiving multimedia information, processing the multimedia information by performing object extraction processing to generate multimedia object descriptions; processing the generated multimedia object descriptions by object hierarchy processing to generate multimedia object hierarchy descriptions, so that at least one description record including the object descriptions and the hierarchy objects descriptions is generated for content embedded within the multimedia information; and storing the record. The multimedia information may be image or video information.

The present invention further provides computer readable media containing digital information with at least one multimedia description record describing multimedia content for corresponding multimedia information. In one arrangement, the media includes at least one object description for corresponding objects embedded in the multimedia information, one or more features characterizing each of the objects; and any available hierarchy information relating at least a portion of the objects in accordance with at least one of the features. The multimedia information may be image or video information, and where video information, the objects may be events or video objects embedded within the video information.

The accompanying drawings, which are incorporated and constitute part of this disclosure, illustrate a preferred embodiment of the invention and serve to explain the principles of the invention.

BRIEF DESCRIPTION OF THE DRAWINGS

FIG. 3 is an illustrative diagram of an image showing exemplary image objects;

FIGS. 4a and 4b are illustrative diagrams showing a set of image objects and exemplary hierarchal organizations for the exemplary image objects shown in FIG. 3;

FIG. 5 is an illustrative diagram of an video showing exemplary video events;

FIGS. 6a and 6b are illustrative diagrams showing a set of video events and an exemplary hierarchal organization for the exemplary video objects shown in FIG. 5;

DESCRIPTION OF THE PREFERRED EMBODIMENTS

Figure 1:
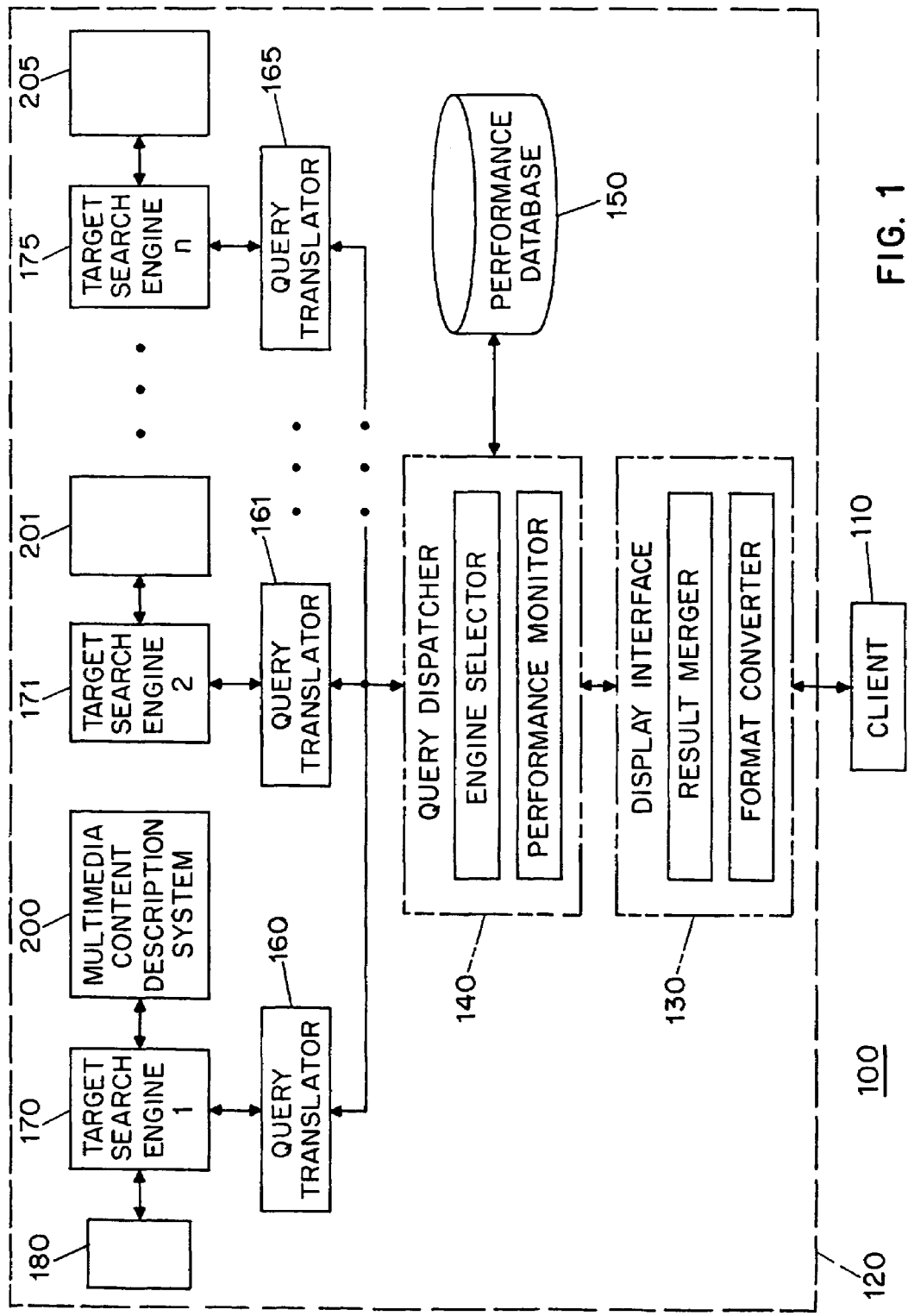
FIG. 1 is a system diagram of a preferred embodiment of the present invention.

Referring to FIG. 1, an exemplary embodiment of the present invention is provided. The architecture of the system 100 includes a client computer 110 and a server computer 120. The server computer 120 includes a display interface 130, a query dispatcher 140, a performance database 150, query translators 160, 161, 165, target search engines 170, 171, 175, an additional client computer 180, and multimedia content description systems 200, 201, 205, which will be described in further detail below.

While the following disclosure will make reference to this exemplary client-server embodiment, those skilled in the art should understand that the particular system arrangement may be modified within the scope of the invention to include numerous well-known local or distributed architectures. For example, all functionality of the client-server system could be included within a single computer, or a plurality of server computers could be utilized with shared or separated functionality. The multimedia content description systems 200, 201, 205, are preferably software routines executing on a general purpose processor within the server computer 120.

Commercially available metasearch engines act as gateways linking users automatically and transparently to multiple text-based search engines. The system of FIG. 1 grows upon the architecture of such metasearch engines and is designed to intelligently select and interface with multiple on-line multimedia search engines by ranking their performance for different classes of user queries. Accordingly, the query dispatcher 140, query translators 160, 161, 165, and display interface 130 of commercially available metasearch engines may be employed in the present invention.

The dispatcher 140 selects the target search engines to be queried by consulting the performance database 150 upon receiving a user query. This database 150 contains performance scores of past query successes and failures for each supported search option. The query dispatcher only selects search engines 170, 171, 175 that are able to satisfy the user's query, e.g. a query seeking color information will trigger color enabled search engines.

The query translators 160, 161, 165, translate the user query to suitable scripts conforming to the interfaces of the selected search engines. The display component 130 uses the performance scores to merge the results from each search engine, and presents them to the user.

In accordance with the present invention, in order to permit a user to intelligently search the Internet or a regional or local network for multimedia content, search queries may be made with respect to the content embedded in multimedia information. Content based search queries may be made by descriptions of multimedia content in accordance with description schemes of the present invention, by example or by sketch. Each search engine 170, 171, 175 employs a description scheme, for example the description schemes described below, to describe the contents of multimedia information accessible by the search engine and to implement the search.

In order to implement a content-based search query for multimedia information generated via client computer 110, the dispatcher 140 will match the query description, through a the multimedia content description system 200, employed by each search engine 170, 171, 175 to ensure the satisfaction of the user preferences in the query. It will then select the target search engines 170, 171, 175 to be queried by consulting the performance database 150. If the user of client computer 110 wants to search by color and one search engine does not support any color descriptors, it will not be useful to query that particular search engine.

Next, the query translators 160 will adapt the query description to descriptions conforming to each selected search engine. This translation will also be based on the description schemes available from each search engine. This task may require executing extraction code for standard descriptors or downloaded extraction code from specific search engines to transform descriptors. For example, if the user specifies the color feature of an object using a color coherence of 166 bins, the query translator will translate it to the specific color descriptors used by each search engine, e.g. color coherence and color histogram of x bins.

Before displaying the results to the user, the query interface will merge the results from each search option by translating all the result descriptions into a homogeneous one for comparison and raking. Again, similarity code for standard descriptors or downloaded similarity code from search engines may need to be executed. User preferences will determine how the results are displayed to the user.

Alternatively, a search query can be entered via client computer 180 which directly interfaces with target search engine 170. Unlike a query entered through client computer 110, client computer 180 will not enable a metasearch via multiple search engines. However, the multimedia content description system 200 may be employed in either arrangement to conduct a content based search in accordance with the present invention.

Figure 2:
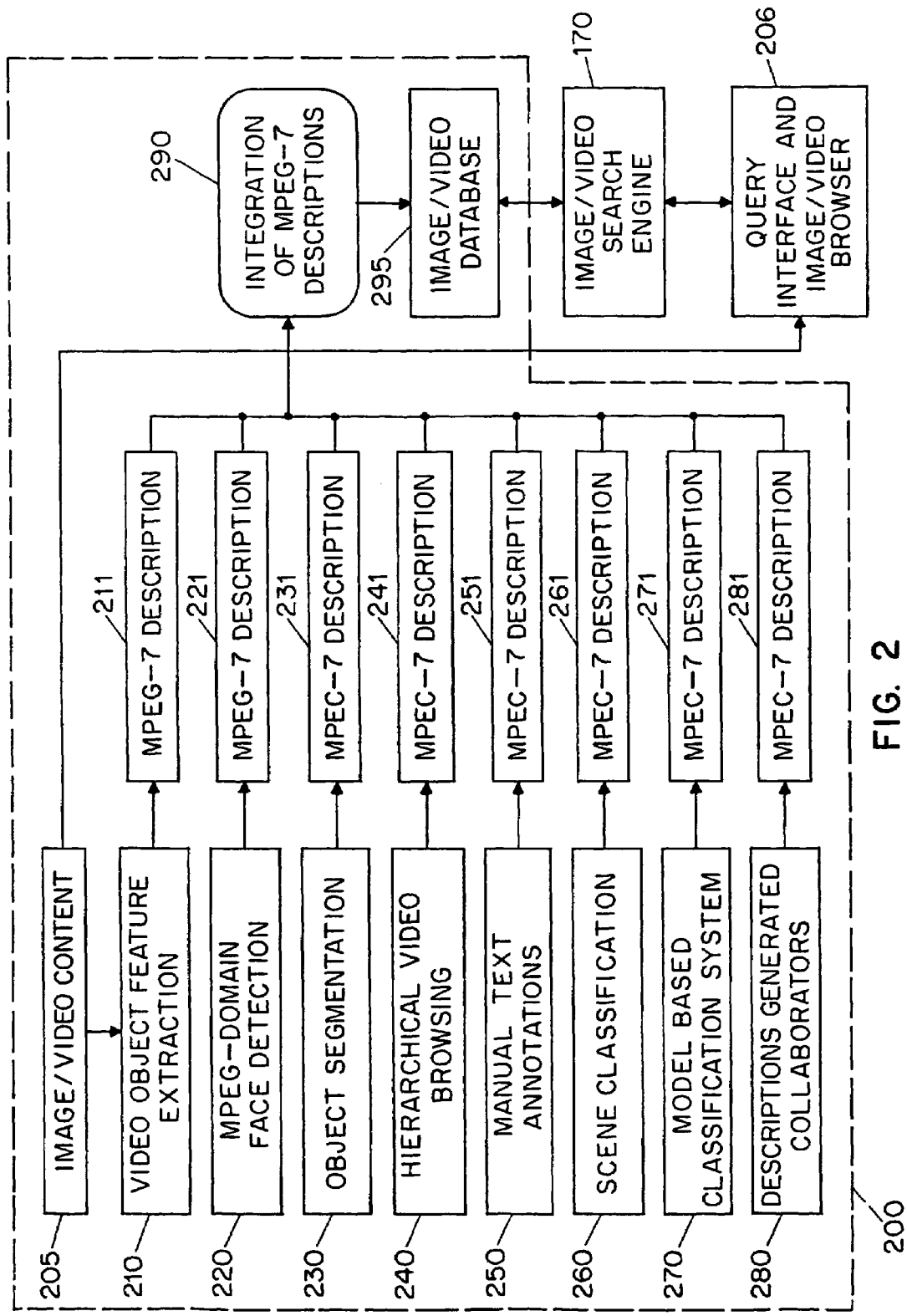
FIG. 2 is a functional diagram of a multimedia content description system suitable for employment in the system of FIG. 1.

Referring next to FIG. 2, a description system 200 which, in accordance with the present invention, is employed by each search engine 170. 171,175 is now described. In the preferred embodiment disclosed herein, the Extensible Markup Language ("XML") is used to describe multimedia content. XML is a subset of the Standard Generalized Markup Language ("SGML"), the standard language for defining and using document formats. SGML allows documents to be self-describing, i.e. they describe their own grammar by specifying the tag set used in the document and the structural relationships that those tags represent. XML retains the key SGML advantages in a language that is designed to be vastly easier to learn, use, and implement than full SGML. A complete description of XML, as would be known to one of ordinary skill in the art, can be found at the World Wide Web Consortium's web page on XML.

The description system 200 advantageously includes several image and video processing, analysis and annotation sub-systems 210, 220, 230, 240, 250, 260, 270, 280 to generate a rich variety of descriptions for a collection of image and video items 205. Each subsystem is described in turn.

The first subsystem 210 is a region-based indexing and searching system which extracts visual features such as color, texture, motion, shape, and size for automatically segmented regions of a video sequence. The system 210 decomposes video into separate shots by scene change detection, which may be either abrupt or transitional (e.g. dissolve, fade in/out, wipe). For each shot, the system 210 estimates both global (i.e. the motion of dominant background), and camera motion, then segments, detects, and tracks regions across the frames in the shot computing different visual features for each region. For each shot, the description generated by this system is a set of regions with visual and motion features, and the camera motion. A complete description of the region-based indexing and searching system 210 is contained in co-pending PCT Application Serial No. PCT/US98/09124, filed May 5, 1998, entitled "An Algorithm and System Architecture for Object-Oriented Content-Based Video Search," the contents of which are incorporated by reference herein.

As used herein, a "video clip" shall refer to a sequence of frames of video information having one or more video objects having identifiable attributes, such as, by way of example and not of limitation, a baseball player swinging a bat, a surfboard moving across the ocean, or a horse running across a prairie. A "video object" is a contiguous set of pixels that is homogeneous in one or more features of interest, e.g., texture, color, motion and shape. Thus, a video object is formed by one or more video regions which exhibit consistency in at least one feature. For example a shot of a person (the person is the "object" here) walking would be segmented into a collection of adjoining regions differing in criteria such as shape, color and texture, but all the regions may exhibit consistency in their motion attribute.

The second subsystem 220 is an MPEG domain face detection system, which efficiently and automatically detects faces directly in the MPEG compressed domain. The human face is an important subject in video. It is ubiquitous in news, documentaries, movies, etc., providing key information to the viewer for the understanding of the video content. This system provides a set of regions with face labels. A complete description of the system 220 is contained in PCT Application Serial No. PCT/US 97/20024, filed Nov. 4, 1997, entitled "A Highly Efficient System for Automatic Face Region Detection in MPEG Video," the contents of which are incorporated by reference herein.

The third subsystem 230 is a video object segmentation system in which automatic segmentation is integrated with user input to track semantic objects in video sequences. For general video sources, the system allows users to define an approximate object boundary by using a tracing interface. Given the approximate object boundary, the system automatically refines the boundary and tracks the movement of the object in subsequent frames of the video. The system is robust enough to handle many real-world situations that are hard to model in existing approaches, including complex objects, fast and intermittent motion, complicated backgrounds, multiple moving objects and partial occlusion. The description generated by this system is a set of semantic objects with the associated regions and features that can be manually annotated with text. A complete description of the system 230 is contained in U.S. patent application Ser. No. 09/405,555, filed Sep. 24, 1998, entitled "An Active System and Algorithm for Semantic Video Object Segmentation," the contents of which are incorporated by reference herein.

The fourth subsystem 240 is a hierarchical video browsing system that parsers compressed MPEG video streams to extract shot boundaries, moving objects, object features, and camera motion, and. It also generates a hierarchical shot-based browsing interface for intuitive visualization and editing of videos. A complete description of the system 240 is contained in PCT Application Serial No. PCT/US 97/08266, filed May 16, 1997, entitled "A Method and Architecture for Indexing and Editing Compressed Video Over the World Wide Web," the contents of which are incorporated by reference herein.

The fifth subsystem 250 is the entry of manual text annotations. It is often desirable to integrate visual features and textual features for scene classification. For images from on-line news sources, e.g. Clarinet, there is often textual information in the form of captions or articles associated with each image. This textural information can be included in the descriptions.

The sixth subsystem 260 is a system for high-level semantic classification of images and video shots based on low-level visual features. The core of the system consists of various machine learning techniques such as rule induction, clustering and nearest neighbor classification. The system is being used to classify images and video scenes into high level semantic scene classes such as {nature landscape}, {city/suburb}, {indoor}, and {outdoor}. The system focuses on machine learning techniques because we have found that the fixed set of rules that might work well with one corpus may not work well with another corpus, even for the same set of semantic scene classes. Since the core of the system is based on machine learning techniques, the system can be adapted to achieve high performance for different corpora by training the system with examples from each corpus. The description generated by this system is a set of text annotations to indicate the scene class for each image or each keyframe associated with the shots of a video sequence. A complete description of the system 260 is contained in S. Paek et al., "Integration of Visual and Text based Approaches for the Content Labeling and Classification of Photographs," ACM SIGIR'99 Workshop on Multimedia Indexing and Retrieval. Berkeley, C A (1999), the contents of which are incorporated by reference herein.

The seventh subsystem 270 is model based image classification system. Many automatic image classification systems are based on a pre-defined set of classes in which class-specific algorithms are used to perform classification. The system 270 allows users to define their own classes and provide examples that are used to automatically learn visual models. The visual models are based on automatically segmented regions, their associated visual features, and their spatial relationships. For example, the user may build a visual model of a portrait in which one person wearing a blue suit is seated on a brown sofa, and a second person is standing to the right of the seated person. The system uses a combination of lazy-learning, decision trees and evolution programs during classification. The description generated by this system is a set of text annotations, i.e. the user defined classes, for each image. A complete description of the system 270 is contained in A. James et al., "Model Based Classification of Visual Information for Content-Based Retrieval," Symp. Elec. Imaging: Multimedia Proc. and App.—Storage Retrieval and for Image and Video Databases VII, IS&T/SPIE '99 (1999), the contents of which are incorporated by reference herein.

Other subsystems 280 may be added to the multimedia content description system 200, e.g., a subsystem used by collaborators to generate descriptions.

In operation, the image and video content 205 may be a database of still images or moving video, a buffer receiving content from a browser interface 206, or a receptacle for live image or video transmission. The subsystems 210, 220, 230, 240, 250, 260, 270, 280 operate on the image and video content 205 to generate descriptions 211, 221, 231, 241, 251, 261, 271, 281 that include low level visual features of automatically segmented regions, user defined semantic objects, high level scene properties, classifications and associated textual information, as described above. Once all the descriptions for an image or video item are generated and integrated 290, the descriptions are input into a database 295, which the search engine 170 accesses.

Figure 7:
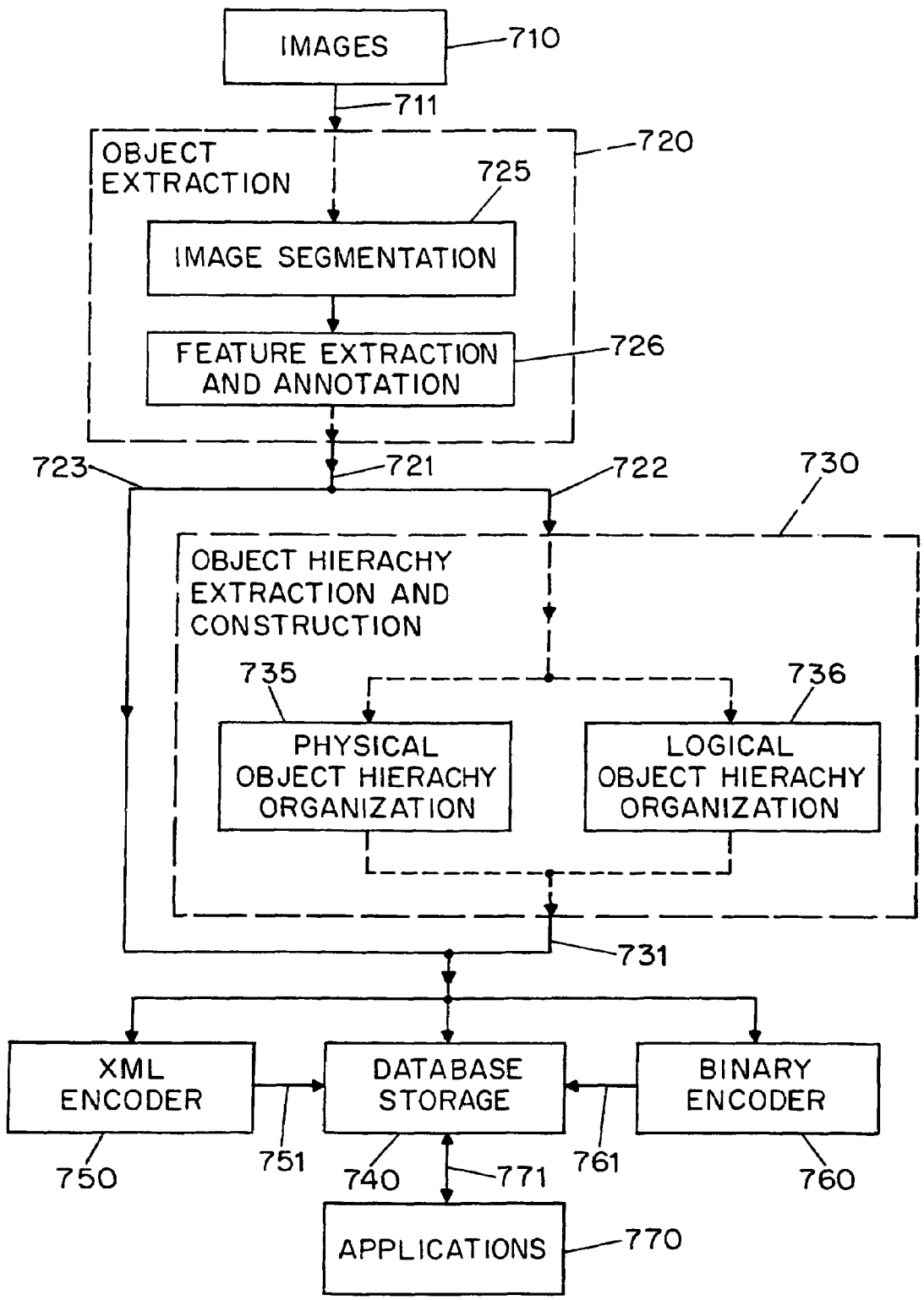
FIG. 7 is a flow diagram of a process which may be implemented in the system of FIG. 1 to generate image descriptions.

The process implemented by the subsystem 210, 220, 230, 240, 250, 260, 270, 280 to generate descriptions 211, 221, 231, 241, 251, 261, 271, 281 in a standard format are described below with reference to FIGS. 7-8. It should be noted that certain of the subsystems, i.e., the region-based indexing and searching subsystem 210 and the video object segmentation system 230 may implement the entire description generation process, while the remaining subsystems implement only portions of the process and may be called on by the subsystems 210,230 during processing. In a similar manner, the subsystems 210 and 230 may be called on be each other for specific tasks in the process.

The standard description schemes for images will now be described with reference to FIGS. 3-4. Referring to FIG. 3, an exemplary image 300 with three persons is shown. The <object> element is the fundamental description element. Each <object> element has an identifier that is unique within a given image description. The identifier is expressed as an attribute of the <object> element e.g. <object id="1">. The <object> element also requires an attribute named type to distinguish between physical objects and logical objects. Physical objects usually correspond to continuous regions of the image with some descriptors in common (features, semantics, etc.)—in other words, real objects in the image. Logical objects are groupings of objects based on some high-level semantic relationships (e.g. faces or people). The <object> elements may also include two more attributes, object_ref and object_node_ref. The former allows deriving one object from an existing one, and the latter links back to nodes in the object hierarchy. The set of all objects identified in an image is included within the object set element (<object_ set>).

Nine exemplary objects are shown in FIG. 3, including the entire family portrait 300, father 310, mother 320, child 330, parents 340, children 350, faces 360, father's face 311, mother's face 321. These objects may be expressed as a set of objects 0, 1, 2, 3, 4, 5, 6, 7, 8, as shown in FIG. 4a, with the entire family portrait 300 being object 0, the father 310 being object 1, the mother 320 being object 2, child 330 being object 3, parents 340 being object 4, children 350 being object 5, faces 360 being object 6, the father's face 311 being object 7 and the mother's face 321 being object 8. In this example, the identified objects are each physical objects with the exception of faces 360, which is a logical object. In XML, these image objects may be expressed as follows:

<object_set>

<!--Family portrait-->

<object id="0" type="PHYSICAL"> . . . </object>

<!--Father-->

<object id="1" type="PHYSICAL"> . . . </object>

<!--Mother-->

<object id="2" type="PHYSICAL"> . . . </object>

<!--Son-->

<object id="3" type="PHYSICAL"> . . . </object>

<!--Parents-->

<object id="4" type="PHYSICAL"> . . . </object>

<!--Children-->

<object id="5" type="PHYSICAL"> . . . </object>

<!--Faces-->

<object id="6" type="LOGICAL"> . . . </object>

<!--Father's face-->

<object id="7" type="PHYSICAL"> . . . </object>

<!--Mother's face-->

<object id="8" type="PHYSICAL"> . . . </object>

</object_set>

In the XML description, each object element has a unique identifier within an image description. The identifier is expressed as an attribute of the object element (id). Another attribute of the object element (type) distinguishes between physical and logical objects. The content of each object element has been left empty to illustrate the overall structure of the image description.

The image description scheme is comprised of object elements that are combined hierarchically in one or more object hierarchy elements (<object_hierarchy>). The hierarchy is a way to organize the object elements in the object set element. Each object hierarchy consists of a tree of object node elements (<object_node>). Each object node points to an object.

The objects in an image can be organized by their location in the image or by their semantic relationships. These two ways to group objects generate two types of hierarchies: physical and logical hierarchies. A physical hierarchy describes the physical location of the objects in the image. On the other hand, a logical hierarchy organizes the objects based on a higher level understanding of their semantics, similar to semantic clustering.

Continuing with the image example of FIG. 3, two possible hierarchies are shown in FIG. 4b, an object hierarchy which organizes objects physically 410 is shown, i.e., objects 4 and 5 are physically within object 0. A second object hierarchy which organizes objects logically 420 is shown, i.e., objects 7 and 8 are associated with object 6. In XML, these two hierarchies may be expressed as follows:

<object_hierarchy type="PHYSICAL">

<!--Family portrait-->

<object_node id="9" object_ref="0">

<!--Parents-->

<object_node id="10" object_ref="4">

<object_node id="11" object_ref="1">

<object_node id="12" object_ref="7"/>

</object_node>

<object_node id="13" object_ref="2"/>

<object_node id="14" object_ref="8"/>

</object_node>

</object_node>

<!--Children-->

<object_node id="15" object_ref="5">

<object_node id="16" object_ref="3"/>

</object_node>

</object_node>

</object_hierarchy>

```
<object_hierarchy type="LOGICAL">
<!-Faces-->
<object_node id="17" object_ref="6">
<object_node id="18" object_ref="7"/>
<object_node id="19" object_ref="8"/>
</object_node>
</object_node>
</object_hierarchy>
```

The type of hierarchy is included in the object hierarchy element as an attribute (type). The object node element has associated a unique identifier in the form of an attribute (id). The object node element references an object element by using the latter's unique identifier. The reference to the object element is included as an attribute (object_ref). An object element can include links back to nodes in the object hierarchy as an attribute.

An object set element and one or more object hierarchy elements form the image element (<image>). The <object> elements in the <object_set> element are combined hierarchically in a <object_hierarchy> element. The attribute object_node_ref of <object> elements points to their corresponding nodes in the <object_hierarchy> elements. On the other hand, the attribute event_ref of <event_node> elements references back to the <object> element.

An <object> element may contain an optional <location> element and the feature descriptor elements, such as <text_annotation>, <color>, <texture>, <shape>, <size>, <position>, <motion>, and <time> elements. The <location> element contains a list of the physical locations of the image. The <time> and <motion> elements only have sense when the object belongs to a video sequence, to be described below. For example:

```
<!--Father's face-->
<object id="7">
<location></location>
<text_annotation></text_annotation>
<color></color>
<shape></shape>
<position></position>
</object>
```

Appendix I presents the complete image description for the example image shown in FIG. 3. The image description scheme is summarized below in Table I.

TABLE I

| Element | Must Contain | May Contain | Can be Contained in |
| --- | --- | --- | --- |
| image | object_set | object_hierarchy(s) | (root element) |
| object_set | object(s) |  | image |
| object |  | location | object_set |
|  |  | text_annotation |  |
|  |  | color |  |
|  |  | texture |  |
|  |  | shape |  |
|  |  | size |  |
|  |  | position |  |
|  |  | motion |  |
|  |  | time |  |

TABLE I-continued

| Element | Must Contain | May Contain | Can be Contained in |
| --- | --- | --- | --- |
| object_hierarchy | object_node |  | image |
| object_node |  | object_node(s) | object_hierarchy |
|  |  |  | object_node(s) |

The location element contains pointers to the locations of the image. Note that annotations can be textual, visual or multimedia. These features can be extracted or assigned automatically, semi-automatically or manually.

When features are extracted automatically, the feature descriptors could include links to extraction and similarity matching code, and may even include annotation elements from external descriptions, as shown in the following example:

```
<object id="4" type="PHYSICAL" object_node_ref="12 16"> <!--Father's face-->
<color> </color>
<texture>
<tamura>
<tamura_value coarseness="0.01" contrast="0.39" orientation="0.7"/>
<code type="EXTRACTION" language="JAVA" version="1.2">
<location> <location_site href="ftp://extraction.tamura.java"/> </location>
</code>
</tamura>
</texture>
<shape> </shape>
<position> </position>
<text_annotation xmlns:extAnDS="http://www.other.ds/annotation.elements">
<extAnDS:Object>Face</extAnDS:Object>
</text_annotation>
</object>
```

A second example, contained in Appendix II hereto, illustrates the content of a particular image, which may include one or more distinct objects, in terms of the features of those objects including the location where the image is stored, text annotations, i.e., the name of the picture, the names of the persons in the picture, the location where the picture was taken, the event that is represented by the picture, and the date of the picture, color features in terms of LUV color, texture features in terms of Tamura texture, and size or dimensions of the image. Thus, information concerning the entire picture, e.g., the location where the image is stored, is descriptive of the object "id=o0," which represents the entire image. Other information concerns other objects within the image. For object "id=o1," is particularly described in the example in terms of text annotation (including the name of the person), color, texture, shape using eigenvalue analysis, size, and position in terms of a segmentation mask analysis. For object "id=o2," only text annotations are provided. Object "id=o3" is a logical object corresponding to the concept of faces.

The standard description schemes for video will now be described with reference to FIGS. 5-6. Referring to FIG. 5, an exemplary video clip 500 with five temporal video events is shown. In the video description scheme, the <event> element is the fundamental description element. Each <event> element has an identifier that is unique within a given video DS description. The identifier is expressed as an attribute of the <event> element, e.g. <event id="1">.

The <event> element requires another attribute named type to distinguish different types of events. The attribute type can have three different values: shot, continuous_group_shots, and discontinuous_group_shots. Discontinuous group of shots will usually be associated together based on common features (e.g. background color) or high-level semantic relationships (e.g. actor on screen). The <event> elements may also include two more attributes, basic_event_ref and event_node_ref. The former allows deriving one event from an existing one, and the latter links back to nodes in the event hierarchy. The set of all events are found within the <event_set> element.

Nine exemplary video events are shown in FIG. 5, including the entire video sequence 500, a scene where the tiger is stalking the prey 510, a scene where the tiger is chasing its prey 520, a scene where the tiger captures its prey 530, and a scene where the tiger is feeding 540. The later scene includes two events, one where the tiger is hiding the food 550, and the second where the tiger is feeding the young 560. These video events, which are parallel to image objects, may be expressed as a set of events 0, 1, 2, 3, 4, 5, 6, as shown in FIG. 6a, with the entire video sequence 500 being event 0, the scene where the tiger is stalking the prey 510 being event 1, the scene where the tiger is chasing its prey 520 being event 2, the scene where the tiger captures its prey 530 being event 4, the scene where the tiger is feeding 540 being event 4, the scene where the tiger is hiding the food 550 being event 5, and the scene where the tiger is feeding the young 560 being event 6. In this example, the identified events are each shots, with the exception of event 4, which is of the type continuous group shots. Non temporally aligned events such as events 1 and 3 could be organized into discontinuous group shots. In XML, these image objects may be expressed as follows:

<event_set>

<!--The Tiger-->

<event id="0" type="SHOT"> ... </event>

<!--Stalking the prey-->

<event id="1" type="SHOT"> ... </event>

<!--The chase-->

<event id="2" type="SHOT"> ... </event>

<!--The capture-->

<event id="3" type="SHOT"> ... </event>

<!-Feeding-->

<event id="4" type="CONTINUOUS_GROUP_SHOTS"> ... </event>

<!--Feeding the young-->

<event id="5" type="SHOT"> ... </event>

<!--Protecting the food-->

<event id="6" type="SHOT"> ... </event>

</event_set>

Note that each <event> element empty to clearly show the overall structure of the video description scheme. It is important to note that the selection and definition of an event in a given video is determined by the author of the description. The <event> element can correspond to either a shot or a scene of a video, or even a combination of these.

The video description scheme is basically comprised of <event> elements that are combined hierarchically in a <event_hierarchy> element. The <event_hierarchy> element must contain a single <event_node> element. The <event_node> contains zero or more <event_node> elements and zero or more <object_hierarchy> elements, as described above for the image description scheme. Each <event_node> element has associated a unique identifier. The identifier is expressed as an attribute of the elements e.g. <event_node id="1">. The hierarchy is a way to organize the <event> elements in the <event_set> element.

The different events that form a video sequence may be grouped or organized in two different ways: by their location in the video sequence or by their semantic relationships. The <event_hierarchy> element includes an attribute, type, to distinguish between physical and logical hierarchies. A physical hierarchy will describe the temporal relationships of the events in the image. On the other hand, logical hierarchies will organize the events based on a higher level understanding of their semantics.

Each <event_node> element consists of a reference to a <event> element, by using the unique identifiers associated with each <event>. The reference to the <event> element is given as an event_ref attribute. The video of FIG. 5 has the hierarchy shown in FIG. 6b. This hierarchy is expressed in XML as follows:

<event_hierarchy type="PHYSICAL">

<!--The Tiger-->

<event_node id="7" event_ref="0">

<!--Stalking the prey-->

<event_node id="8" event_ref="1"/>

<!--The chase-->

<event_node id="9" event_ref="2"/>

<!-Capture-->

<event_node id="10" event_ref="3"/>

<!-Feeding-->

<event_node id="11" event_ref="4">

<!--Hiding the food-->

<event_node id="12" event_ref="5"/>

<!--Feeding the young-->

<event_node id="13" event_ref="6"/>

<event_/node>

</event_node>

</event_hierarchy>

An event set element and one or more even hierarchy elements form the video element (<video>). The video element symbolizes the video sequence being described. The <event> elements in the <event_set> element are combined hierarchically in a <event_hierarchy> element. The attribute event_node_ref of <event> elements points to the corresponding nodes in the <event_hierarchy> elements. On the other hand, the attribute event_ref of <event_node> elements references back to the <event> element.

In the video description scheme, an <event> element can contain the following elements:

<location> (optional)

<transition> (optional)

<text_annotation> (optional)

<object_set> (optional)

<camera_motion> (optional)

<time> (optional)

<key_frame> (zero or more)

The <object_set> <text_annotation> and the <location> elements are defined above with respect to the image description scheme. The <transition> element describes the transitions between shots. Thus, event 3 in the tiger video can be described as follows:

<!-Capture-->

<concept>The capture of the prey</concept>

<text_annotation> . . . </text_annotation>

<object_set> . . . </object_set>

<camera_motion> . . . </camera_motion>

<time> . . . </time>

<key_frame> . . . </key_frame>

Appendix III presents the complete video description for the example image shown in FIG. 5.

In the video description scheme, the event element contains features including location, shot transition (i.e. various within shot or across shot special effects), camera motion, time, key frame, annotation and object set elements, among others. The object element is defined in the image description scheme; it represents the relevant objects in the event. As in the image description, these features can be extracted or assigned automatically or manually. For those features extracted automatically, the feature descriptors can include links to extraction and similarity matching code. For example, <event id="3" type="PHYSICAL" event_node_ref="10">
<!-Capture-->

A second example contained in Appendix IV describes the content of a particular video sequence which may include one or more distinct events, in terms of the features of those events including the location where the video is stored, text annotations, i.e., the name of the video, the names of the persons in the video, the location where the video was taken, the event that is represented by the video, and the date of the video, the objects within that video sequence, the camera motion, the total time of the video sequence in terms of number of frames, and keyframes. This information concerning the entire video sequence is descriptive of the event id=E0. Other information concerns other objects within the image.

The event hierarchy used to organize the described content is a physical hierarchy and describes temporal relationships. In this case, the only event is id=E0 which corresponds to the entire video. Within that event, two hierarchies are used to described the objects within the event, i.e., a physical and logical hierarchy, and parallel the physical and logical hierarchies described previously for the image example.

The process implemented by the system 200 to generate the image and video descriptions described with reference to FIGS. 3-6 shall now be described with reference to FIGS. 7-8. FIG. 7 is a flow diagram which illustrates a preferred process for generating descriptions for images. Digital image data 710 is applied to the computer system via link 711. The image data may be non-compressed, or may be compressed in accordance with any suitable compression scheme, e.g., JPEG.

The computer system, under the control of suitable application software, first performs object extraction 720 on the image data 710, in order to generate image objects. Object extraction 720 may take the form of a fully automatic processing operation, a semi-automatic processing operation, or a substantially manual operation in which objects are defined primarily through user interaction, such as via a user input device.

In a preferred method, object extraction 720 consists of two subsidiary operations, namely image segmentation 725 and feature extraction and annotation 726. For the image segmentation 725 step, any region tracking technique which partitions digital images into regions that share one or more common characteristics may be employed. Likewise, for the feature extraction and annotation step 326, any technique which generates features from segmented regions may be employed. The region-based indexing and searching subsystem 210 described above is suitable for automated image segmentation and feature extraction; the video object segmentation system 230 described above is suitable example of a semi-automated image segmentation and feature extraction. Manual segmentation and feature extraction could alternatively be employed.

The object extraction processing 720 generates an image object set 721 and optional related features such as annotations (collectively "image object descriptions"), which are preferably further processed by an object hierarchy extraction and construction module 730. Alternatively, the objects 721 could be directly stored in a database 740, or encoded by an XML encoder 750 or a binary encoder 760 and then stored 751, 752 in database 740.

The object hierarchy extraction and construction module 730 operates on the image object descriptions to generate image object hierarchy descriptions 731. Preferably, both physical object hierarchy organization 735 and logical object hierarchy organization 736 are performed in parallel to generate descriptions 731. The region-based indexing and searching subsystem 210 described above is suitable for automated image object hierarchy construction; the video object segmentation system 230 described above is suitable example of a semi-automated, object hierarchy construction Manual object hierarchy construction could alternatively be employed.

The image object hierarchy descriptions 731 are either directly stored in a database 740, or are encoded by an XML encoder 750 or a binary encoder 760 and then stored 751, 752 in database 740 as an image description record. Once the image description records have been stored in data base storage 740, they remain available in a useful format for access and use by other applications 770, such as search, filter and archiving applications for example, via bidirectional link 771.

Figure 8:
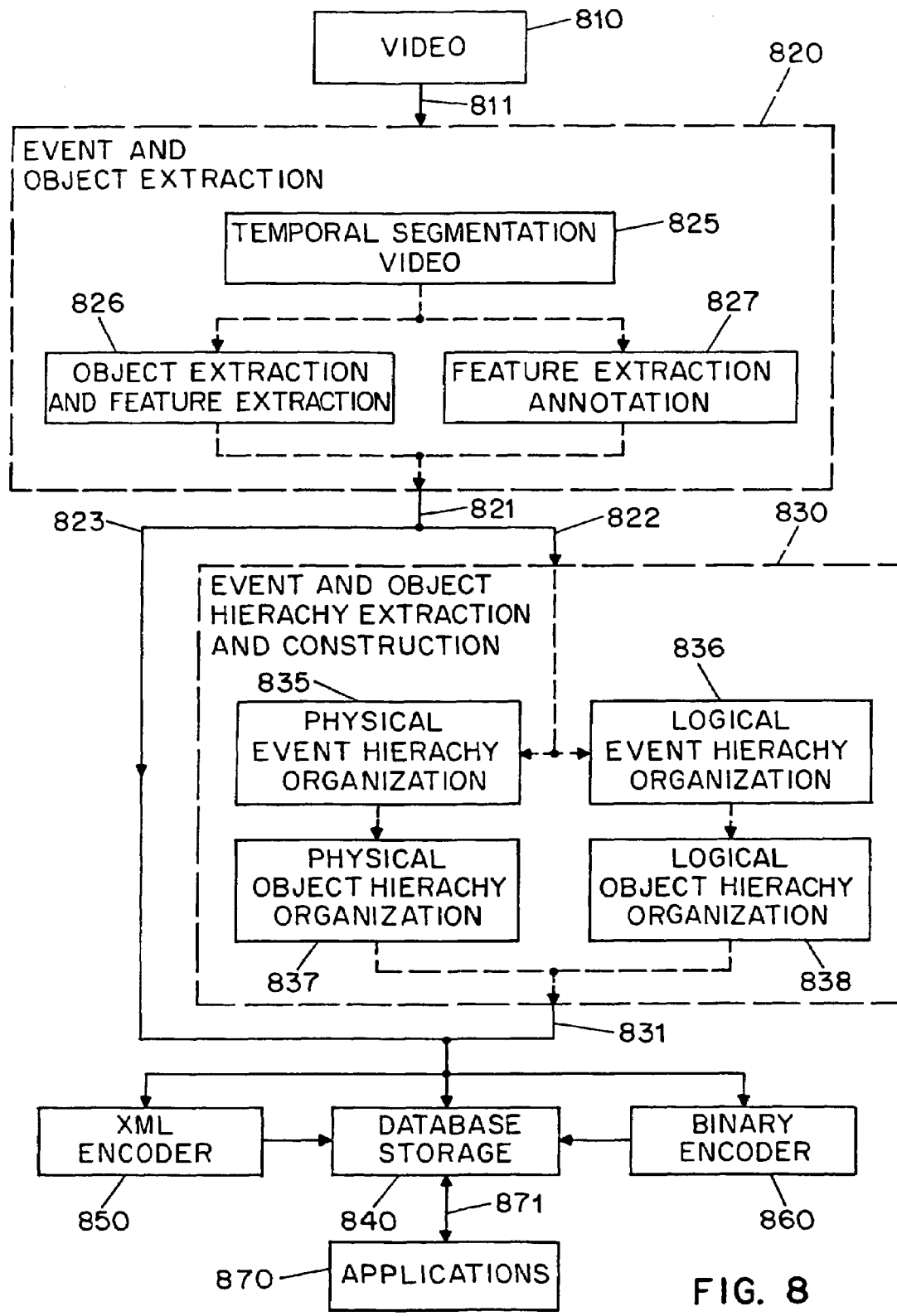
FIG. 8 is a flow diagram of a process which may be implemented in the system of FIG. 1 to generate video descriptions.

FIG. 8 is a flow diagram which illustrates a preferred process for generating descriptions for video. Digital video data 810 is applied to the computer system via link 811. The video data may be non-compressed, or may be compressed in accordance with any suitable compression scheme, e.g., MPEG-1, MPEG-2, MPEG-4, motion JPEG, H.261 or H.263.

The computer system, under the control of suitable application software, first performs event and object extraction 820 on the video data 810, in order to temporally segment the video data 810 into video events and to locate video objects within the events. Video event and object extraction 820 may take the form of a fully automatic processing operation, a semi-automatic processing operation, or a substantially manual operation in which objects are defined primarily through user interaction, such as via a user input device.

In a preferred method, the video event and object extraction process 820 consists of three subsidiary operations, namely temporal video segmentation 825, object extraction 826 and feature extraction and annotation 827. For the segmentation 825 step, the video is temporally partitioned into shots, continuous groups of shots, or discontinuous groups of shots, that share one or more common characteristics. For the object extraction 826 step, video objects are extracted from the video shots in a similar manner to the extraction of image objects from still images, except that motion and time information may be utilized. The feature extraction and annotation step 827 may be performed in parallel with the object extraction step 826 and operates on the temporally segmented video shots to generate features such as camera motion, key frames and text annotations. The region-based indexing and searching subsystem 210 described above is suitable for automated segmentation, object extraction and feature extraction; the video object segmentation system 230 described above is suitable example of a semi-automated segmentation, object extraction and feature extraction. Manual segmentation and extraction could alternatively be employed.

The event and object extraction processing 820 generates an event and video object set 821 and optional related features such as annotations (collectively "video object descriptions"), which are preferably further processed by an event and object hierarchy extraction and construction module 830. Alternatively, the events and video objects 821 could be directly stored in a database 840, or encoded by an XML encoder 850 or a binary encoder 860 and then stored in database 840.

The module 830 operates on the video object descriptions to generate video object hierarchy descriptions 831. Preferably, the video object descriptions are operated on in parallel by both physical and logical operations. Thus, the video object descriptions may be subjected to both physical (temporal) event hierarchy organization 835 and logical event hierarchy organization 836 in parallel, and then to physical object hierarchy organization 837 and logical object hierarchy organization 838, so that both video events and objects embedded within those events are hierarchically organized. The region-based indexing and searching subsystem 210 described above is suitable for automated video object hierarchy construction; the video object segmentation system 230 described above is suitable example of a semi-automated video object hierarchy construction. Manual video object hierarchy construction could alternatively be employed.

The video object hierarchy descriptions 831 are either directly stored in a database 840 together with the video object descriptions, or encoded by an XML encoder 850 or a binary encoder 860 and then stored in database 840, as an video description record. Once the video description records have been stored in data base storage 840, they remain available in a useful format for access and use by other applications 870, such as search, filter and archiving applications for example, via bidirectional link 871.

The foregoing merely illustrates the principles of the invention. Various modifications and alterations to the described embodiments will be apparent to those skilled in the art in view of applicants' teachings, herein. It will thus be appreciated that those skilled in the art will be able to devise numerous systems and methods which, although not explicitly shown or described herein, embody the principles of the invention and are thus within the spirit and scope of the invention.

The invention claimed is:

1. A system for creating a description record from multimedia information, comprising:
    (a) at least one multimedia information input interface receiving said multimedia information;
    (b) a computer processor, coupled to said at least one multimedia information input interface, receiving said multimedia information therefrom, processing said multimedia information by performing object extraction processing to create multimedia object descriptions from said multimedia information, said object descriptions associated with distinct multimedia objects, and processing said created multimedia object descriptions by object hierarchy processing to create multimedia object hierarchy descriptions indicative of an organization of said object descriptions and said distinct associated multimedia objects, wherein at least one description record including said multimedia object descriptions and said multimedia object hierarchy descriptions is created for content embedded within said multimedia information wherein said description record allows for searching said multimedia information for said embedded content; and
    (c) a data storage system, operatively coupled to said processor, for storing said at least one description record.

2. The system of claim 1, wherein said multimedia information comprises image information, said multimedia object descriptions comprise image object descriptions, and said multimedia object hierarchy descriptions comprise image object hierarchy descriptions.

3. The system of claim 2, wherein said object extraction processing comprises:
(a) image segmentation processing to segment each image in said image information into regions within said image; and
(b) feature extraction processing to create one or more feature descriptions for one or more of said regions;
whereby said created object descriptions comprise said one or more feature descriptions for one or more of said regions.

4. The system of claim 3, wherein said one or more feature descriptions are selected from the group consisting of text annotations, color, texture, shape, size, and position.

5. The system of claim 2, wherein said object hierarchy processing comprises physical object hierarchy organization to create physical object hierarchy descriptions of said image object descriptions that are based on spatial characteristics of said objects, such that said image object hierarchy descriptions comprise physical descriptions.

6. The system of claim 5, wherein said object hierarchy processing further comprises logical object hierarchy organization to create logical object hierarchy descriptions of said image object descriptions that are based on semantic characteristics of said objects, such that said image object hierarchy descriptions comprise both physical and logical descriptions.

7. The system of claim 6, wherein said object extraction processing comprises:
(a) image segmentation processing to segment each image in said image information into regions within said image; and
(b) feature extraction processing to create object descriptions for one or more of said regions;
and wherein said physical hierarchy organization and said logical hierarchy organization create hierarchy descriptions of said object descriptions for said one or more of said regions.

8. The system of claim 7, further comprising an encoder receiving said image object hierarchy descriptions and said image object descriptions, and encoding said image object hierarchy descriptions and said image object descriptions into encoded description information, wherein said data storage system is operative to store said encoded description information as said at least one description record.

9. The system of claim 1, wherein said multimedia information comprises video information, said multimedia object descriptions comprise video object descriptions including both event descriptions and object descriptions, and said multimedia hierarchy descriptions comprise video object hierarchy descriptions including both event hierarchy descriptions and object hierarchy descriptions.

10. The system of claim 9, wherein said object extraction processing comprises:
(a) temporal video segmentation processing to temporally segment said video information into one or more video events or groups of video events and create event descriptions for said video events,
(b) video object extraction processing to segment said one or more video events or groups of video events into one or more regions, and to create object descriptions for said regions; and
(c) feature extraction processing to create one or more event feature descriptions for said one or more video events or groups of video events, and one or more object feature descriptions for said one or more regions;
wherein said created video object descriptions include said event feature descriptions and said object descriptions.

11. The system of claim 10, wherein said one or more event feature descriptions are selected from the group consisting of text annotations, shot transition, camera motion, time and key frame, and wherein said one or more object feature descriptions are selected from the group consisting of color, texture, shape, size, position, motion, and time.

12. The system of claim 9, wherein said object hierarchy processing comprises physical event hierarchy organization to create physical event hierarchy descriptions of said video object descriptions that are based on temporal characteristics of said video objects, such that said video hierarchy descriptions comprise temporal descriptions.

13. The system of claim 12, wherein said object hierarchy processing further comprises logical event hierarchy organization to create logical event hierarchy descriptions of said video object descriptions that are based on semantic characteristics of said video objects, such that said hierarchy descriptions comprise both temporal and logical descriptions.

14. The system of claim 13, wherein said object hierarchy processing further comprises physical and logical object hierarchy extraction processing, receiving said temporal and logical descriptions and creating object hierarchy descriptions for video objects embedded within said video information, such that said video hierarchy descriptions comprise temporal and logical event and object descriptions.

15. The system of claim 14, wherein said object extraction processing comprises:
(a) temporal video segmentation processing to temporally segment said video information into one or more video events or groups of video events and create event descriptions for said video events,
(b) video object extraction processing to segment said one or more video events or groups of video events into one or more regions, and to create object descriptions for said regions; and
(c) feature extraction processing to create one or more event feature descriptions for said one or more video events or groups of video events, and one or more object feature descriptions for said one or more regions;
wherein said created video object descriptions include said event feature descriptions and said object descriptions, and wherein said physical event hierarchy organization and said logical event hierarchy organization create hierarchy descriptions from said event feature descriptions, and wherein said physical object hierarchy organization and said logical object hierarchy organization create hierarchy descriptions from said object feature descriptions.

16. The system of claim 15, further comprising an encoder receiving said video object hierarchy descriptions and said video object descriptions, and encoding said video object hierarchy descriptions and said video object descriptions into encoded description information, wherein said data storage system is operative to store said encoded description information as said at least one description record.

17. A method for creating a description record from multimedia information, comprising the steps of:
(a) receiving said multimedia information;
(b) processing by a computer processor said multimedia information by performing object extraction processing to create multimedia object descriptions from said multimedia information said object descriptions associated with distinct multimedia objects;
(c) processing said created multimedia object descriptions by object hierarchy processing to create multimedia object hierarchy descriptions indicative of an organization of said object descriptions and said distinct associated multimedia objects, wherein at least one description record including said multimedia object descriptions and said multimedia object hierarchy descriptions is created for content embedded within said multimedia information wherein said description record allows for searching said multimedia information for said embedded content; and (d) storing said at least one description record.

18. The method of claim 17, wherein said multimedia information comprises image information, said multimedia object descriptions comprise image object descriptions, and said multimedia object hierarchy descriptions comprise image object hierarchy descriptions.

19. The method of claim 18, wherein said object extraction processing step comprises the sub-steps of:

(a) image segmentation processing to segment each image in said image information into regions within said image; and (b) feature extraction processing to create one or more feature descriptions for one or more of said regions;

whereby said created image object descriptions comprise said one or more feature descriptions for one or more of said regions.

20. The method of claim 19, wherein said one or more feature descriptions are selected from the group consisting of text annotations, color, texture, shape, size, and position.

21. The method of claim 18, wherein said step of object hierarchy processing includes the sub-step of physical object hierarchy organization to create physical object hierarchy descriptions of said image object descriptions that are based on spatial characteristics of said objects, such that said image hierarchy descriptions comprise physical descriptions.

22. The method of claim 21, said step of object hierarchy processing further includes the sub-step of logical object hierarchy organization to create logical object hierarchy descriptions of said image object descriptions that are based on semantic characteristics of said objects, such that said image object hierarchy descriptions comprise both physical and logical descriptions.

23. The method of claim 22, wherein said step of object extraction processing further includes the sub-steps of:

(a) image segmentation processing to segment each image in said image information into regions within said image; and (b) feature extraction processing to create object descriptions for one or more of said region;

and wherein said physical object hierarchy organization sub-step and said logical object hierarchy organization sub-step create hierarchy descriptions of said object descriptions for said one or more of said regions.

24. The method of claim 18, further comprising the step of encoding said image object descriptions and said image object hierarchy descriptions into encoded description information prior to said data storage step.

25. The method of claim 17, wherein said multimedia information comprises video information, said multimedia object descriptions comprise video object descriptions including both event descriptions and object descriptions, and said multimedia hierarchy descriptions comprise video object hierarchy descriptions including both event hierarchy descriptions and object hierarchy descriptions.

26. The method of claim 25, wherein said step of object extraction processing comprises the sub-steps of:

(a) temporal video segmentation processing to temporally segment said video information into one or more video events or groups of video events and create event descriptions for said video events, (b) video object extraction processing to segment said one or more video events or groups of video events into one or more regions, and to create object descriptions for said regions; and (c) feature extraction processing to create one or more event feature descriptions for said one or more video events or groups of video events, and one or more object feature descriptions for said one or more regions;

wherein said created video object descriptions include said event feature descriptions and said object descriptions.

27. The method of claim 26, wherein said one or more event feature descriptions are selected from the group consisting of text annotations, shot transition, camera motion, time and key frame, and wherein said one or more object feature descriptions are selected from the group consisting of color, texture, shape, size, position, motion, and time.

28. The method of claim 25, wherein said step of object hierarchy processing includes the sub-step of physical event hierarchy organization to create physical event hierarchy descriptions of said video object descriptions that are based on temporal characteristics of said video objects, such that said video hierarchy descriptions comprise temporal descriptions.

29. The method of claim 28, wherein said step of object hierarchy processing further includes the sub-step of logical event hierarchy organization to create logical event hierarchy descriptions of said video object descriptions that are based on semantic characteristics of said video objects, such that said hierarchy descriptions comprise both temporal and logical descriptions.

30. The method of claim 29, wherein said step of object hierarchy processing further comprises the sub-step physical and logical object hierarchy extraction processing, receiving said temporal and logical descriptions and creating object hierarchy descriptions for video objects embedded within said video information, such that said video hierarchy descriptions comprise temporal and logical event and object descriptions.

31. The method of claim 30, wherein said step of object extraction processing comprises the sub-steps of:

(a) temporal video segmentation processing to temporally segment said video information into one or more video events or groups of video events and create event descriptions for said video events, (b) video object extraction processing to segment said one or more video events or groups of video events into one or more regions, and to create object descriptions for said regions; and (c) feature extraction processing to create one or more event feature descriptions for said one or more video events or groups of video events, and one or more object feature descriptions for said one or more regions;

wherein said created video object descriptions include said event feature descriptions and said object descriptions, and wherein said physical event hierarchy organization and said logical event hierarchy organization create hierarchy descriptions from said event feature descriptions, and wherein said physical object hierarchy organization and said logical object hierarchy organization create hierarchy descriptions from said object feature descriptions.

32. The method of claim 31, further comprising the step of encoding said video object descriptions and said video object hierarchy descriptions into encoded description information prior to said data storage step.

* * * * *

UNITED STATES PATENT AND TRADEMARK OFFICE
CERTIFICATE OF CORRECTION

PATENT NO. : 7,653,635 B1  
APPLICATION NO. : 09/830899  
DATED : January 26, 2010  
INVENTOR(S) : Seungup Paek et al.

It is certified that error appears in the above-identified patent and that said Letters Patent is hereby corrected as shown below:

On page 1, Column 1, line 6, insert the following header and paragraph:

--Statement Regarding Federally Sponsored Research or Development  
This invention was made with government support under grant number 8811111 awarded by the National Science Foundation. The government has certain rights in the invention.--

Signed and Sealed this
Thirtieth Day of October, 2012

David J. Kappos
*Director of the United States Patent and Trademark Office*